(12) United States Patent
Henderson

(10) Patent No.: US 6,540,179 B2
(45) Date of Patent: Apr. 1, 2003

(54) IN-FLIGHT LOADABLE AND REFUELABLE UNMANNED AIRCRAFT SYSTEM FOR CONTINUOUS FLIGHT

(75) Inventor: J. Kirston Henderson, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 201 days.

(21) Appl. No.: 09/738,227

(22) Filed: Dec. 15, 2000

(65) Prior Publication Data

US 2002/0074454 A1 Jun. 20, 2002

(51) Int. Cl.[7] .............................. B64D 37/00; B64C 1/22
(52) U.S. Cl. ............................... 244/135 A; 244/137.1; 244/63; 244/110 E; 244/12.1
(58) Field of Search .............................. 244/135 A, 12.1, 244/13, 63, 110 E, 118.1, 137.1, 2

(56) References Cited

U.S. PATENT DOCUMENTS

| 3,389,880 A | * | 6/1968 | Ferguson | ................ 244/137.1 |
|---|---|---|---|---|
| 3,520,502 A | * | 7/1970 | Smethers, Jr. | ........... 244/137.1 |
| 5,103,712 A | * | 4/1992 | Minovitch | ............... 244/137.1 |
| 5,906,336 A | * | 5/1999 | Eckstein | ................. 244/135 A |
| 6,079,664 A | * | 6/2000 | Salzberger | ............... 244/137.1 |

* cited by examiner

Primary Examiner—J. Woodrow Eldred
(74) Attorney, Agent, or Firm—Jackson Walker LLP

(57) ABSTRACT

A method for refueling and reloading an unmanned aircraft for continuous flight is disclosed herein wherein the unmanned aircraft is maintained and supported by a support aircraft. Both aircraft maintain cargo bays and in-flight operable doors located on the underside of each aircraft for the purposes of docking and exchanging goods. Preferably the goods comprise loadable cartridges and may contain such items as weapons, cargo, or fuel for example. In one embodiment, when both aircraft are in a docked configuration for exchange of goods during flight, the in-flight operable doors open and the support aircraft is capable of loading such cartridges aboard the unmanned aircraft. When necessary the support aircraft may load gear for the purposes of landing the unmanned aircraft. Alternate methods of reloading an unmanned aircraft for continuous flight is disclosed wherein the unmanned aircraft does not have cargo bay doors and the aircraft is supported by a support aircraft.

20 Claims, 3 Drawing Sheets

# IN-FLIGHT LOADABLE AND REFUELABLE UNMANNED AIRCRAFT SYSTEM FOR CONTINUOUS FLIGHT

BACKGROUND OF THE INVENTION

1. Technical Field of the Invention

The present invention relates generally to the equipping and docking of aircraft, and, more particularly to the reloading and refueling of continuous flight unmanned aircraft systems.

2. Description of Related Art

The cargo transportation industry is crucial to the day-to-day functionality of our society as a whole. In order for goods to get from the manufacturer to the final point of destination, cargo must be shipped and transported via land, sea, or air. Every method has an associated means for transportation of such goods and an expense associated with such transportation means. One such means is air cargo transport. Various weapons are delivered on targets in time of war by manned aircraft or by unmanned guided weapons of various types. Development effort is currently being expended by the U.S. military toward development of unmanned combat aircraft that take off from airfields, deliver weapons on targets, and return to airfields for refueling and reloading of weapons. The unmanned combat aircraft require use of airfields and ground based support personnel.

Air cargo transport is currently facilitated by manned aircraft that land and take off from conventional airports. A significant element in operational cost of manned air cargo transport concerns the flight deck crew required for operation of the cargo aircraft and on-board provisions to support the flight crew. During long flights, expensive flight deck crews are often paid to spend many hours merely riding along with the aircraft flying with automatic controls. Eliminating the need for flight crews will decrease the overall operational expenditure and the cost of air cargo shipment. Although an unmanned cargo plane would seem to be an obvious solution, problems arise with considering unmanned aircraft. Landing and take-off of an unmanned aircraft presents problems in providing necessary communication links between ground controllers and the unmanned aircraft. Operation of unmanned aircraft from typical airports presents a potential safety problem to other aircraft and populated areas, thereby making conventional unmanned aircraft approaches for cargo shipment unattractive. Operation of unmanned aircraft from an airport or airbase also requires ground based personnel with special training in take-off, landing and ground support of unmanned aircraft.

Every time an unmanned aircraft needs to be recharged with supplies or fuel, there is an expense associated with the manpower necessary to assist and land such an aircraft. The same scenario holds true for take off of such an aircraft. Fuel utilization on take off and landing of a vehicle is inefficient in comparison with the utilization of fuel during flight. Landing of an unmanned aircraft presents additional problems in providing necessary communication links between ground controllers and the unmanned aircraft, particularly in combat situations or when the communication must cross enemy lines. Communications relay aircraft or satellites used for other communications must typically be utilized.

Communications relays and antennas typically must be located on towers or in orbiting satellites. Towers provide limited coverage because the curvature of the Earth limits lines of sight. Consequently large numbers of such towers are necessary to provide the desired coverage. The large number of towers presents an exploded operational expense. Orbiting satellites overcome the Earth's curvature problems, however, they present problems of limited capacity per satellite and high expense for building and placing the satellite in orbit. If a satellite system fails, the time and expense involved in replacing a failed satellite can be exorbitant.

Previous attempts to use unmanned aircraft for air cargo or weapons transport have involved a need to periodically land the unmanned aircraft for fuel. Conventional in-flight refueling approaches present difficult problems for unmanned aircraft and increased danger to manned refueling aircraft. Maintaining the necessary relative locations for the tankers and unmanned aircraft for the duration of the fueling operations is difficult. Therefore the unmanned aircraft must land for refueling. In order for such an aircraft to land at a base, such a base must be equipped for ground handling, take-off and landing of unmanned aircraft. Such provisions must be available at any location in which unmanned aircraft are used. Unless ground controllers remain at the home base for unmanned combat aircraft, such controllers and their equipment must be deployed to forward locations to support aircraft operations. Such deployments present logistical problems in addition to problems of locating ground facilities for such deployments.

For military combat aircraft, personnel and equipment must be deployed to war theater airbases to support unmanned combat aircraft. Support personnel must be deployed to bases used by unmanned aircraft to refuel the aircraft and to reload or change weapons carried by the aircraft. The requirement to return to base between missions for refueling and reloading of weapons reduces the number of missions executable within a given time by each unmanned combat aircraft. Airbase use by unmanned aircraft presents problems similar to those found at conventional airports. Shared use of bases between manned and unmanned aircraft presents base capacity, safety and air traffic control problems.

Manpower and facility provisions necessary in both the civilian and military arenas provide an excessive expense to the operation of unmanned aircraft. Landings necessary to the utilization of unmanned aircraft are further complicated in the military arena where airbase traffic can become very heavy during time of war and where ground support personnel must be deployed. Therefore maintaining the aircraft in a situation of continuous flight addresses not only facility and personnel provisions but the issues of flight safety for manned aircraft operated from forward military airbases during time of war and combat availability of the manned aircraft for combat missions. There is, therefore, a need for an unmanned aircraft capable of operation over a long period of time without the need to land for the purposes of refueling and reloading of payloads.

SUMMARY OF THE INVENTION

The present invention achieves technological advances as an unmanned aircraft capable of continuous flight such that the problems of landing facilities and personnel are addressed and solved. Concern with untimely disclosure of information to an enemy is obviated by creating an aircraft capable of continuous flight.

A system consisting of an in-flight reloadable and in-flight refuelable continuously flying unmanned aircraft and a companion support aircraft enables the continuously flying unmanned aircraft to operate on a continuous basis without landing for either a series of military or commercial missions. The support aircraft is typically a much larger aircraft such as a wide body transport and may be either manned or unmanned. The support aircraft ferries and loads fuel, cargo, or weapons to the continuously flying unmanned aircraft. Both aircraft are specially configured to dock with each other during flight. In-flight refueling provisions are further included in both the continuously flying unmanned aircraft and the support aircraft to enable the support aircraft to refuel the continuously flying unmanned aircraft while it is docked with the support aircraft.

The present invention provides an unmanned aircraft able to operate over long periods of time and over a multiplicity of missions without need to land for the purposes of refueling or reloading of payloads. The unmanned aircraft is able to carry a multiplicity of different payloads within standard payload bay cartridges and such may be loaded and unloaded from a support aircraft during flight while the unmanned aircraft and the support ships are docked.

The present invention further provides a practical means for unmanned aircraft to dock and launch from support aircraft during flight.

The present invention also provides a means to transfer fuel from a support aircraft to unmanned aircraft while docked together during flight.

The present invention also provides a means to transfer fuel from the support aircraft to the unmanned aircraft while the unmanned aircraft is attached to extendable attachment devices of the support aircraft with these devices in the extended position.

The present invention also provides a means to remove the landing gear from the unmanned aircraft after takeoff, thus allowing the weight and space to be available for payloads.

The present invention also provides a means to extend and retract the landing gear of the unmanned aircraft while the unmanned aircraft is attached to extendable attachment devices of the support aircraft with these devices in the extended position.

BRIEF DESCRIPTION OF THE DRAWINGS

For a more complete understanding of the present invention, reference is made to the following detailed description taken in conjunction with the accompanying drawings, wherein like numerals refer to like elements, wherein.

DETAILED DESCRIPTION OF THE PREFERRED EMBODIMENT

Figure 1:
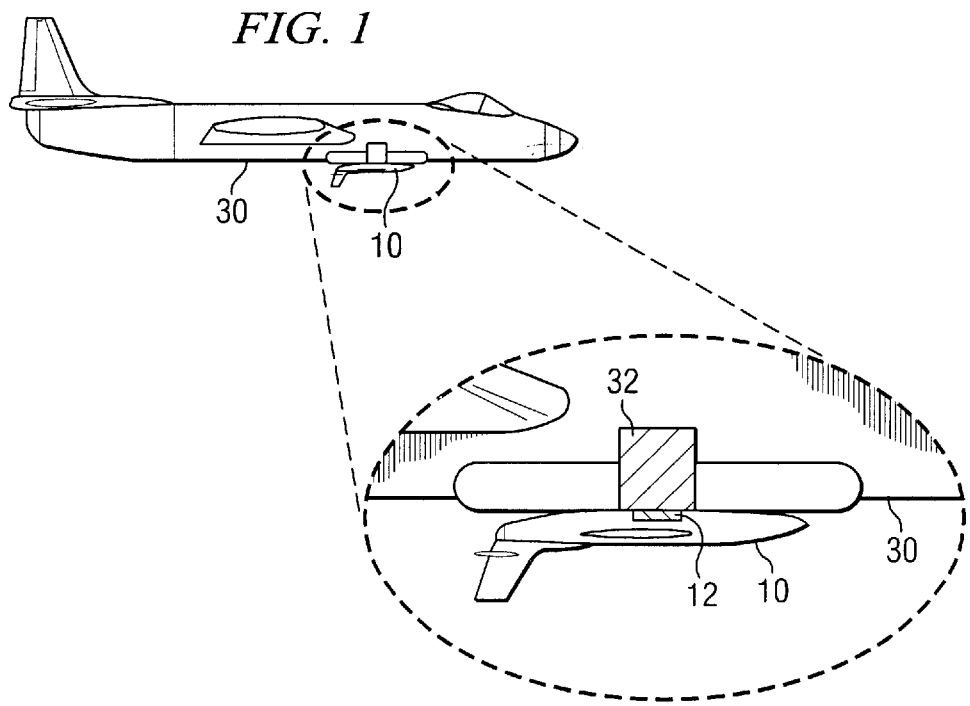
FIG. 1 is a side view of a preferred embodiment of two docked aircraft for the exchange of goods.

The present invention provides a preferred embodiment of a method for exchanging goods between a support aircraft and an unmanned aircraft capable of continuous flight. FIG. 1 is a side view of a preferred embodiment of two docked aircraft for the exchange of goods. In the preferred embodiment, the process of docking a continuously flying unmanned aircraft 10 with a support aircraft 30 is accomplished while flying the continuously flying unmanned 10 aircraft in an inverted position as shown so that the payload cartridge bay 12 of the continuously flying unmanned aircraft 10 faces the payload cartridge loading and unloading bay 32 of the support aircraft 30. Orientation of the payload cartridge bay 12 of the continuously flying unmanned aircraft 10 toward the bay 32 of the support aircraft 30 enables cartridges to be loaded and unloaded through the same set of bay doors used for dropping weapons or other payloads. Thus a need for separate payload loading or unloading doors and separate landing gear doors on the continuously flying unmanned aircraft 10 is obviated.

In order for the two aircraft to dock properly, a sensor system may be carried aboard the support aircraft 30 to precisely measure the relative location of the continuously flying unmanned aircraft 10 during approaches to and departures from the docked configuration in a preferred embodiment. A master guidance control system aboard the support aircraft 30 provides the necessary commands to the control system of the continuously flying unmanned aircraft 10 to fly the aircraft into the desired docking position, (i.e., attitude and velocity before, during, and after docking). Special control surfaces may be utilized on the continuously flying unmanned aircraft 10 to allow fine shifting of aircraft position for docking without need to change any aircraft attitude from the desired attitude for docking.

Figure 2:
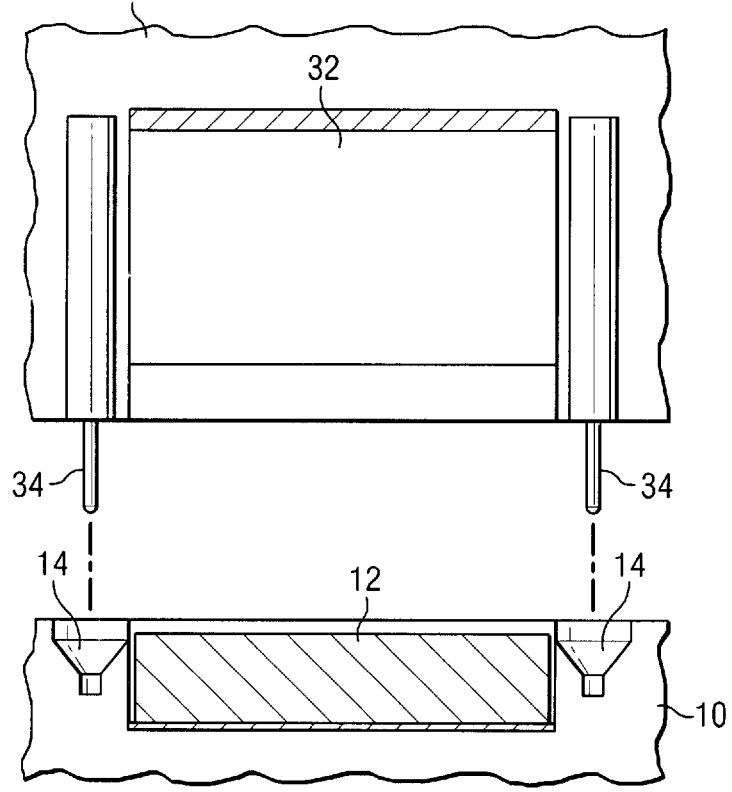
FIG. 2 is an exploded view of an embodiment of two docking aircraft.

FIG. 2 is an exploded view of the two aircraft as they are docking. A continuously flying unmanned aircraft 10 is equipped with a specially designed payload cartridge bay 12 with in-flight operable doors. The payload cartridge bay 12 is equipped with provisions to allow a loading or unloading mechanism in the support aircraft 30 to both detach and remove payload cartridges between the bays 12, 32 and insert into and attach payload cartridges between the bays 12, 32 while the two aircraft are docked during flight. In a preferred configuration, a payload cartridge bays 12, 32 are located on the bottoms of aircraft 10, 30 fuselage and at the aircraft center of mass. The payload cartridge bay 12 is located on the bottom side of the continuously flying unmanned aircraft 10 so that a single bay may be used for dropping of weapons and for the aircraft landing gear. This bottom location also aids in placing the door away from aircraft aerodynamic control surfaces. Subsequently, in the preferred embodiment the payload bay 32 of the support aircraft 30 is located on the bottom of the support aircraft fuselage and as far as practical from aircraft engines and aerodynamic control surfaces. The support aircraft 30 is equipped with a payload cartridge load and unload bay 32 with doors that are operable both on the ground and in-flight.

The continuously flying unmanned-aircraft is equipped with capture and attachment provisions 34 to enable a properly equipped support aircraft 30 to attach to a continuously flying unmanned aircraft 10 while the continuously flying unmanned aircraft 10 is flying proximate near the support aircraft 30. The capture and attachment devices 34 of the support aircraft 30 are preferably extendable and are designed to pull the attached continuously flying unmanned aircraft 10 into position and hold the aircraft 10 in solid contact with appropriately designed support surfaces on the surface of the support aircraft 30 so that the two aircraft are flying as a single unitary aircraft. These attachment devices 34 are further capable of pushing away the continuously flying unmanned aircraft 10 from the support ship 30 and then releasing it for independent flying.

The forward extendable capture and attachment devices 34 of the support aircraft 30 may be extended alone for initial capture of the unmanned aircraft 10 for secure connection at the forward capture sockets 14. The aft extendable capture and attachment device 34 may then be extended to capture the unmanned aircraft 10 at the corresponding aft attachment point 14 while the unmanned aircraft 10 is being restrained by the forward capture and attachment device 34. Furthermore the docking means, made up of capture sockets 14 and attachment and capture devices 34, maybe utilized as a refueling means if both sockets 14 and devices 34 are maintained in fluid communication with both a fuel storage and a fuel supply respectively. This capability enables the use of smaller and less complex support aircraft 30 as tankers for the support of unmanned aircraft 10 on long missions.

Figure 3A:
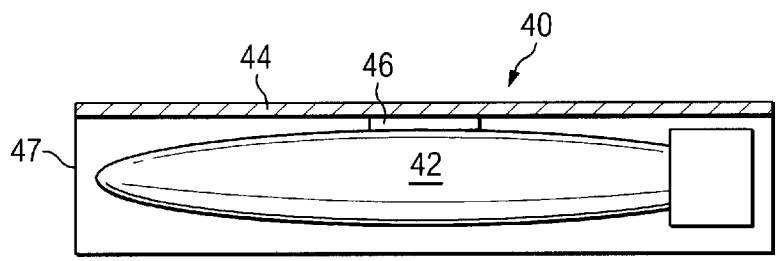
FIGS. 3a–d are examples of cartridges loadable by the support aircraft of a preferred embodiment.
Figure 3B:
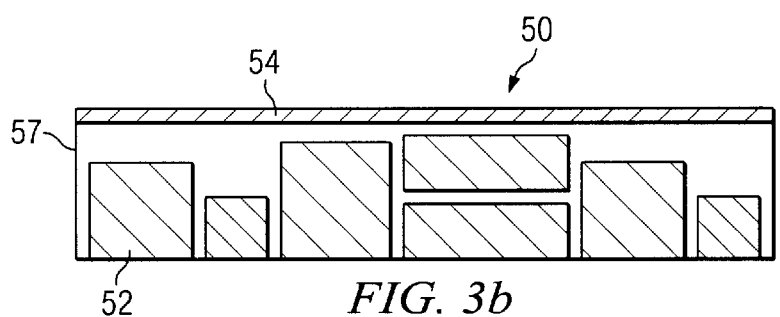
Figure 3C:
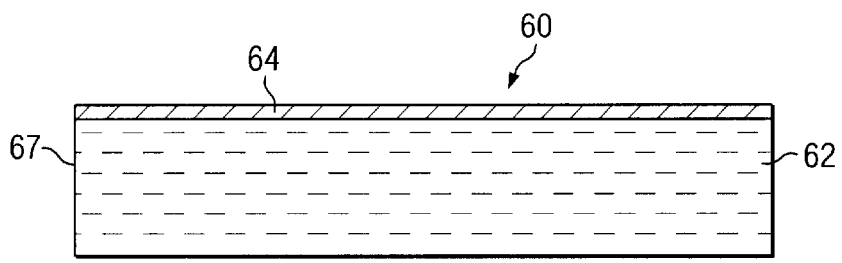
Figure 3D:
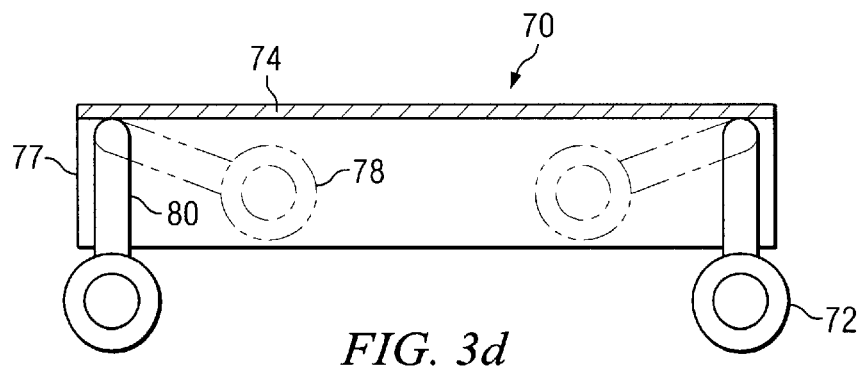

FIGS. 3a–d and FIGS. 4a–d are examples of cartridges loadable by the support aircraft. A wide range of payload cartridges may be used. Such payload cartridge types include weapons, cargo, fuel, or landing gear, for example. FIGS. 3a–d are examples of internally mounted type payload cartridges. Each cartridge 40, 50, 60, and 70 includes a mounting pallet 44, 54, 64, and 74, a cartridge enclosure 47, 57, 67, and 77, and the specific payload. Referring to FIG. 3a there is illustrated a weapon cartridge 40 in accordance with an aspect of the present invention, in which a weapon 42 is releasably mounted by a mounting device 46 to an inside surface of the mounting pallet 44 within the cartridge enclosure 47. The outside surface of the mounting pallet 44 is configured to be releasably mounted to an internal surface of a support aircraft in a bay area. The outside surface of the mounting pallets 54, 64, and 74 of each cartridge illustrated in FIGS. 3b–d are also configured to be releasably mounted to an internal surface of a support aircraft in a bay area.

FIG. 3b illustrates a cargo cartridge 50 in which cargo 52 is contained within the cartridge enclosure 57. Specific examples of types of cargo cartridges include electronic equipment and sensory equipment, for example. Electronic equipment cartridges can have such uses as communication relay aircraft applications. Sensor equipment cartridges can be utilized for mapping or for wartime reconnaissance type missions.

FIG. 3c illustrates a fuel cartridge 60 in which the cartridge enclosure 67 is configured to preferably store aircraft fuel. Again, the mounting pallet 64 enables the fuel cartridge 60 to be mounted in a bay area of the support aircraft. Fuel cartridges 60 allow for increased ferry ranges for the continuously flying unmanned aircraft 10. Although the docking means may be further utilized as a refueling means as specified above, in situations where a support ship will not be available for some time it might be necessary to utilize the assistance of fuel cartridges 60. Such situations might include, but are not limited to, situations of national security of situations wherein the additional cost of a support aircraft is not within the budget of the implied mission, for example. The fuel cartridge enclosure 67 is also preferably configured to allow the unmanned aircraft to access the fuel via a receiving unit located within the unmanned aircraft.

FIG. 3d illustrates a landing gear cartridge 70 in which take-off and landing gear 72 of a continuously flying unmanned aircraft are mounted within the cartridge enclosure 77. The landing gear 72 is configured to be retractable into and out-of the cartridge enclosure 77. Item 80 illustrates extended landing gear and item 78 illustrates completely retracted landing gear. This equipment is used during infrequent take-offs and landings and may therefore be removed shortly after take-off by a support aircraft 30 thereby allowing the same cartridge and gear to be utilized by multiple aircraft. A further advantage of this assembly is that the main cargo bay 12 of the unmanned aircraft 10 may be used for both payload cartridges and landing gear. A landing gear cartridge 70 is re-installed by a support aircraft 30 prior to any landings of the continuously flying unmanned aircraft 10. Absence of the take-off and landing gear 72 in the continuously flying unmanned aircraft 10 enables a smaller, less massive, less complex and less expensive aircraft than would be possible if the gear were carried as a permanent part of the aircraft.

Location of the take-off and landing gear in a payload bay in-flight replaceable cartridge (1) reduces the operational mass of the aircraft by eliminating the mass of the landing gear and landing gear doors from the aircraft except during take-offs and landing, 2) eliminates the need for separate takeoff and landing gear doors and door actuating devices, and (3) eliminates the need for internal volume in the aircraft for takeoff and landing gear. Because the takeoff and landing gear are needed only for takeoff and landing, it is not necessary to provide a set of this equipment for each unmanned aircraft. This equipment can be shared by multiple aircraft.

In the preferred embodiment, actuating power to extend 80 or retract 78 the landing gear 72 carried in the landing gear cartridges 70 may be provided by a cartridge loading and unloading device of the support aircraft 30 so that the continuously flying unmanned aircraft 10 is passive with regard to the extend and retract operations and is not required to provide any power for these operations.

Figure 4A:
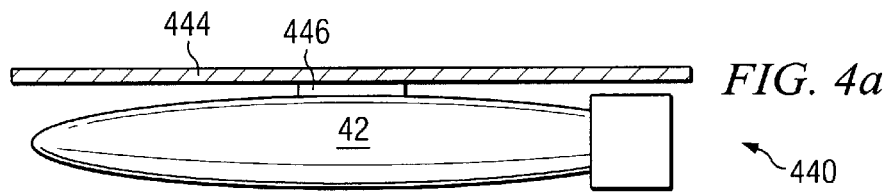
FIGS. 4a–d are examples of cartridges loadable by the support aircraft of an alternative embodiment.
Figure 4B:
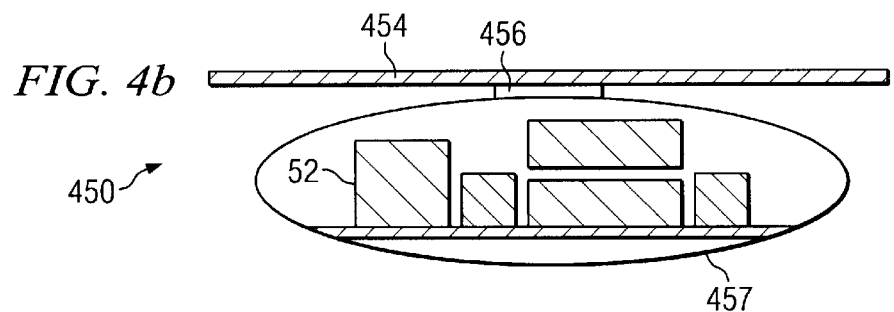

FIGS. 4a–b are examples of flush mounted type payload cartridges. Each cartridge includes a mounting pallet 444, 454, 464, and 474 which is configured to be flush mounted to an outside surface of a support aircraft. The flush mount is preferably a releasable type mount. FIG. 4a illustrates a weapon cartridge 440 in which a weapon 42 is releasably mounted by a mounting device 446 to the mounting pallet 444. Note that with the flush mount weapon cartridge 440, the weapon 42 is preferably of a configuration to minimize drag and/or radar cross section.

FIG. 4b illustrates a cargo cartridge 450 in which cargo 52 is contained within the cartridge enclosure 457. The cartridge enclosure 457 is releasably mounted by a mounting device 456 to the mounting pallet 454. The cartridge enclosure 457 is preferably configured to minimize drag and/or radar cross section. The cargo 52 can be of the type described in FIG. 3b.

Figure 4C:
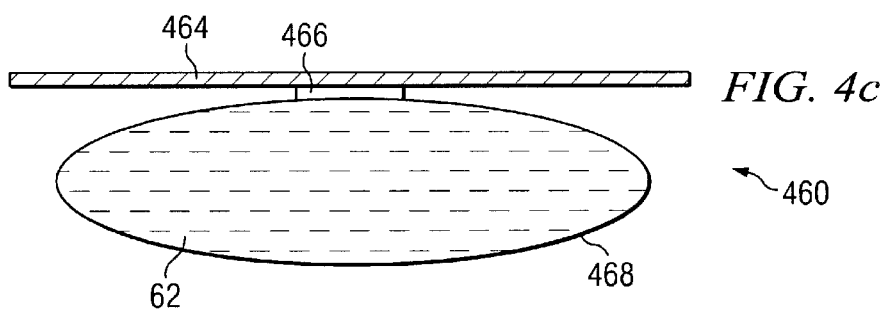

FIG. 4c illustrates a fuel cartridge 460 in which the cartridge enclosure 468 is configured to preferably store aircraft fuel and is further configured to minimize drag and/or radar cross section. The cartridge enclosure 468 is releasably mounted by a mounting device 466 to the mounting pallet 464.

Figure 4D:
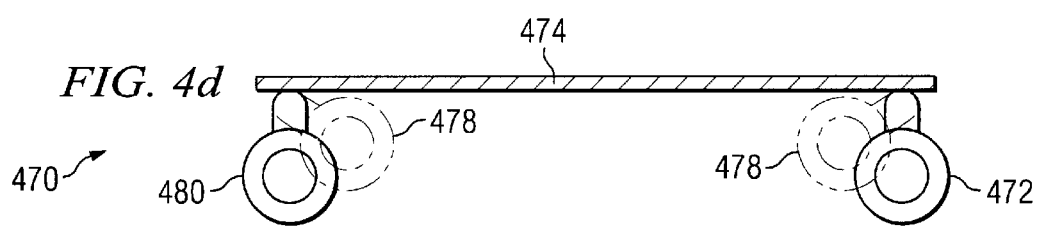

FIG. 4d illustrates a landing gear cartridge 470 in which take-off and landing gear 472 of a continuously flying unmanned aircraft are mounted to the mounting pallet 474. The landing gear 472 is configured to be retractable to multiple positions. Item 480 illustrates the landing gear 472 fully extended to allow maximum clearance and item 478 illustrates a completely retracted landing gear in which the landing gear 472 is positioned closely to the mounting pallet 474.

By utilizing the aforementioned payload cartridges, an increase in use rate is achieved for the support vehicle because it does not waste time in returning to an airfield, landing, and taking off between missions. By greatly reducing the number of aircraft take-offs and landings there is inherently a reduction in airfield capacity requirements. The number of sites equipped to handle take-off, landing and ground handling of unmanned aircraft is reduced.

Figure 5:
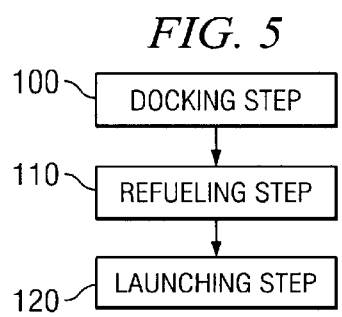
FIG. 5 is a flow diagram of the refueling method.
Figure 6:
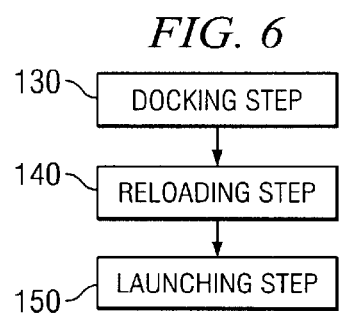
FIG. 6 is a flow diagram of the reloading method.

FIG. 5 and FIG. 6 are flow diagrams of the refueling method and the reloading method, respectively. In FIG. 5, the refueling method requires docking 100 a support aircraft and a continuous flying aircraft preferably for the purposes of refueling the continuous flying aircraft. As detailed above, the support aircraft 10 preferably observes an inverted flight pattern when docking with the support aircraft 30. Once in such a flight pattern, the payload cartridge bay 12 of the continuously flying unmanned aircraft 10 faces the payload cartridge loading and unloading bay 32 of the support aircraft 30. If fuel cartridges 60 and 460 are utilized in the refueling process 110, the support aircraft 30 may then load the cartridges and set the cartridges aboard the continuous flight aircraft 10. If the refueling process 110 consists of refueling the continuous flight aircraft 10 via the docking means 14, 34 then the support aircraft 30 will refuel the continuous flight 10 aircraft via such means by way of hoses or connectors, for example. Once refueled, the support aircraft 30 is able to launch 120 the continuous flight aircraft 10 back into flight patterns consistent with the specific mission of the aircraft 10 and the support aircraft 30 may then proceed to another continuous flight aircraft and repeat the process.

With regard to FIG. 6, the support aircraft 30 and the continuous flight aircraft 10 undergo steps similar to those of the refueling 110 acts of FIG. 5 wherein the refueling 110 involves cartridges 60 or the like. Both aircraft may be either manned or unmanned, however in a preferred embodiment the support aircraft 30 is manned and the continuous flight aircraft 10 is unmanned. As above, the support aircraft 30 preferably observes an inverted flight pattern while docking 130 with the support aircraft 30. Once in such a flight pattern, the payload cartridge bay 12 of the continuously flying unmanned aircraft 10 faces the payload cartridge loading and unloading bay 32 of the support aircraft 30. The two aircraft are then capable of utilizing merely the engine power of the support aircraft 30 as the two aircraft are then capable of unitary flight, "belly-to-belly". Orientation of the payload cartridge bay 12 of the continuously flying unmanned aircraft 10 toward the bay 32 of the support aircraft 30 thus enables cartridges 40, 50, 70, 440, 450 and 470 to be loaded and unloaded during the attachment/detachment process 140 through the same set of bay doors used for dropping of weapons or other payload and avoids a need for separate payload loading or unloading doors and separate landing gear doors on the continuously flying unmanned aircraft 10.

The support aircraft 30 has storage for payload cartridges 40, 50, 60, 70, 440, 450, 460 and 470 has internal machinery for moving the payload cartridges 40, 50, 60, 70, 440, 450, 460 and 470 between storage positions and the cartridge loading and unloading bay 32 of the support aircraft 30. The support aircraft 30 preferably has a device specially designed to move payload cartridges 40, 50, 60, 70, 440, 450, 460 and 470 into and out of the cartridge bay 12 of the continuously flying unmanned aircraft 10. Such a device has the capability to both attach the cartridges 40, 50, 60, 70, 440, 450, 460 and 470 to attachment points in the continuously flying unmanned aircraft 10 and to detach the cartridges 40, 50, 60, 70, 440, 450, 460 and 470 from such attachment points to allow removal from the bay 12. In a preferred embodiment, actuating power for such attach and detach operations 140 is provided by the device of the support aircraft 30 so that the continuously flying unmanned aircraft 10 is passive with regard to the attach and detach operations 140.

Once reloaded the support aircraft 30 is able to launch 150 the continuous flight aircraft 10 back into a flight pattern consistent with the specific mission of the aircraft 10 and the support aircraft 30 may then proceed to another continuous flight aircraft and repeat the process.

Although a preferred embodiment of the method and system of the present invention has been illustrated in the accompanied drawings and described in the foregoing detailed description, it is understood that obvious variations, numerous rearrangements, modifications and substitutions can be made without departing from the spirit and the scope of the invention as defined by the appended claims.

What is claimed is:

1. A method of refueling an unmanned continuous flight aircraft, said unmanned aircraft comprising:
    an aircraft capable of multiple missions via continuous flight configured to dock to a support aircraft, both maintaining a payload bay on the bottom side of the aircraft;
    comprising the step of:
        maintaining said unmanned aircraft in an inverted flight pattern;
        docking both said aircraft in a configuration for refueling via a docking means; and
        exchanging fuel via both said payload bays.

2. The method of refueling an unmanned aircraft of claim 1, wherein said cargo bay of the continuous flight aircraft is located at the aircraft center of mass.

3. The method of refueling an unmanned aircraft of claim 2, wherein said cargo bay of the continuous flight aircraft is capable of dropping or exchanging weapons.

4. The method of refueling an unmanned aircraft of claim 2, wherein said cargo bay of the continuous flight aircraft is capable of dropping or exchanging cargo.

5. The method of refueling an unmanned aircraft of claim 4, wherein said cargo is in the form of a cartridge.

6. The method of refueling an unmanned aircraft of claim 5, wherein said cartridges comprise either one of the following: weapons, fuel, cargo, electronic equipment, sensors, take-off or landing gear.

7. The method of refueling an unmanned aircraft of claim 2, wherein said cargo bay maintains in flight operable doors.

8. The method of refueling an unmanned aircraft of claim 1, wherein said docking means is capable of configuring the aircraft to fly as a single aircraft.

9. The method of refueling an unmanned aircraft of claim 1, wherein said docking means is capable of launching said continuous flight aircraft.

10. The method of refueling an unmanned aircraft of claim 1, wherein the support aircraft is also unmanned.

11. A method of reloading an unmanned continuous flight aircraft, said unmanned aircraft comprising:
    an aircraft capable of multiple missions via continuous flight configured to dock to a support aircraft, both maintaining a payload bay on the bottom side of the aircraft;
    comprising the step of:
        maintaining said unmanned aircraft in an inverted flight pattern;
        docking both said aircraft in a configuration for reloading via a docking means; and
        exchanging cargo via both said payload bays.

12. The method of reloading an unmanned aircraft of claim 11, wherein said cargo bay of the continuous flight aircraft is located at the aircraft center of mass.

13. The method of reloading an unmanned aircraft of claim 12, wherein said cargo bay of the continuous flight aircraft is capable of dropping or exchanging weapons.

14. The method of reloading an unmanned aircraft of claim 12, wherein said cargo bay of the continuous flight aircraft is capable of dropping or exchanging cargo.

15. The method of reloading an unmanned aircraft of claim 14, wherein said cargo is in the form of a cartridge.

16. The method of reloading an unmanned aircraft of claim 15, wherein said cartridges comprise either one of the following: weapons, fuel, cargo, electronic equipment, sensors, take-off or landing gear.

17. The method of reloading an unmanned aircraft of claim 12, wherein said cargo bay maintains in flight operable doors.

18. The method of reloading an unmanned aircraft of claim 11, wherein said docking means is capable of configuring the aircraft to fly as a single aircraft.

19. The method of reloading an unmanned aircraft of claim 11, wherein said docking means is capable of launching said continuous flight aircraft.

20. The method of reloading an unmanned aircraft of claim 11, wherein the support aircraft is also unmanned.

* * * * *